United States Patent
Eckel et al.

(10) Patent No.: US 6,747,078 B1
(45) Date of Patent: Jun. 8, 2004

(54) FLAME-RESISTANT POLYCARBONATE ABS MOULDING MATERIALS

(75) Inventors: Thomas Eckel, Dormagen (DE); Michael Zobel, Düsseldorf (DE); Dieter Wittmann, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/720,273

(22) PCT Filed: Jun. 12, 1999

(86) PCT No.: PCT/EP99/04061

§ 371 (c)(1), (2), (4) Date: Dec. 21, 2000

(87) PCT Pub. No.: WO00/00543

PCT Pub. Date: Jan. 6, 2000

(30) Foreign Application Priority Data

Jun. 26, 1998 (DE) .......................... 198 28 538

(51) Int. Cl.$^7$ ............................................. C08K 5/5399
(52) U.S. Cl. ......................... 524/116; 524/122; 524/138
(58) Field of Search ................. 524/116, 119, 524/112, 138, 139; 252/609

(56) References Cited

U.S. PATENT DOCUMENTS

| | | | | |
|---|---|---|---|---|
| 4,937,285 A | * | 6/1990 | Wittmann et al. | 525/67 |
| 5,126,404 A | * | 6/1992 | Eckel et al. | 525/67 |
| 5,552,465 A | * | 9/1996 | Wittman et al. | 525/67 |
| 5,912,321 A | | 6/1999 | Raith et al. | 528/399 |
| 6,020,081 A | | 2/2000 | Raith et al. | 428/704 |
| 6,060,583 A | | 5/2000 | Raith et al. | 528/488 |
| 6,093,759 A | | 7/2000 | Gareiss et al. | 524/122 |

FOREIGN PATENT DOCUMENTS

| | | |
|---|---|---|
| EP | 315 868 | 5/1989 |
| EP | 0 363 608 | 4/1990 |
| EP | 0 417 839 | 3/1991 |
| EP | 0 482 451 | 4/1992 |
| EP | 0 728 811 | 8/1996 |

* cited by examiner

*Primary Examiner*—Peter Szekely
(74) *Attorney, Agent, or Firm*—Joseph C. Gil; Aron Preis; James R. Franks

(57) ABSTRACT

The present invention relates to thermoplastic polycarbonate molding compositions which contain phosphazenes and special graft polymers produced by means of redox initiator systems and are distinguished by substantially improved mechanical properties.

13 Claims, No Drawings

FLAME-RESISTANT POLYCARBONATE ABS MOULDING MATERIALS

FIELD OF THE INVENTION

The present invention relates to thermoplastic polycarbonate moulding compositions which contain phosphazenes and special graft polymers produced by means of redox initiator systems and are distinguished by substantially improved mechanical properties.

BACKGROUND OF THE INVENTION

DE-A 196 16 968 describes polymerisable phosphazene derivatives, a process for the production thereof and the use thereof as curable binders for lacquers, coatings, fillers, surfacing compositions, adhesives, mouldings or films.

WO 97/40 092 describes flameproofed moulding compositions prepared from thermoplastic polymers and unsubstituted phosphazenes of the type $PN_{n-x}H_{l-y}$.

EP-A 728 811 describes a thermoplastic blend consisting of aromatic polycarbonate, graft copolymer, copolymer and phosphazenes which exhibits good flameproofing properties, impact strength and heat resistance.

Neither WO 97/40 092 nor EP-A 728 811 describe a combination of phosphazenes and the special graft polymers.

EP-A-315 868 (=U.S. Pat. No. 4,937,285) describes moulding compositions made from thermoplastic polycarbonates which contain redox graft polymers. No mention is made of adding phosphazenes.

SUMMARY OF THE INVENTION

The object of the present invention is to provide flame-resistant polycarbonate/ABS moulding compositions having very good mechanical properties such as notched impact strength, stress cracking resistance, flame resistance and weld line strength. This range of properties is required in particular for applications in data processing, such as for example thin-walled casings for monitors, printers etc.

It has now been found that PC/ABS moulding compositions which contain phosphazenes and a graft polymer produced by means of a redox initiator system exhibit the desired properties.

The present invention accordingly provides thermoplastic moulding compositions containing A) 40 to 99, preferably 60 to 98.5 parts by weight of aromatic polycarbonate and/or polyester carbonate B) 0.5 to 60, preferably 1 to 40, in particular 2 to 25 parts by weight of graft polymer, characterised in that the graft polymers B comprise B.1) 5 to 95, preferably 30 to 80 wt. % of one or more vinyl monomers and B.2) 95 to 5, preferably 20 to 70 wt. % of one or more particulate diene rubbers having a glass transition temperature of <10° C., preferably of <0° C., particularly preferably of <−20° C., which are produced by emulsion polymerisation, wherein the graft polymerisation is performed using an initiator system comprising an organic hydroperoxide and ascorbic acid, C) 0 to 45, preferably 0 to 30, particularly preferably 2 to 25 parts by weight of at least one thermoplastic polymer selected from the group comprising thermoplastic vinyl (co)polymers and polyalkylene terephthalates, D) 0.1 to 50, preferably 2 to 35, in particular 5 to 25 parts by weight of at least one component selected from the group comprising phosphazenes of the formulae

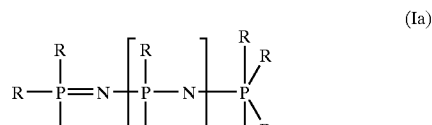

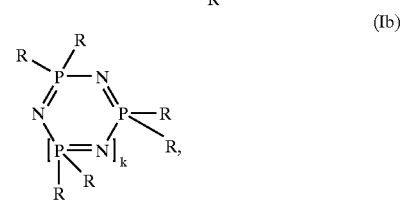

in which

R is in each case identical or different and denotes amino, $C_1$ to $C_8$ alkyl, in each case optionally halogenated, preferably halogenated with fluorine, or $C_1$ to $C_8$ alkoxy, $C_5$ to $C_6$ cycloalkyl, $C_6$ to $C_{20}$ aryl, preferably phenyl or naphthyl, $C_6$ to $C_{20}$ aryloxy, preferably phenoxy, naphthyloxy, or $C_7$ to $C_{12}$ aralkyl, preferably phenyl-$C_1$-$C_4$-alkyl, in each case optionally substituted by alkyl, preferably $C_1$-$C_4$ alkyl, and/or halogen, preferably chlorine and/or bromine k denotes 0 or a number from 1 to 15, preferably a number from 1 to 10, E) 0 to 5, preferably 0.1 to 1, particularly preferably 0.1 to 0.5 parts by weight of fluorinated polyolefin.

DETAILED DESCRIPTION OF THE INVENTION

Component A

Component A aromatic polycarbonates and/or aromatic polyester carbonates which are suitable according to the invention are known from the literature or may be produced using processes known from the literature (c.f. in relation to the production of aromatic polycarbonates, for example Schnell, *Chemistry & Physics of Polycarbonates*, Interscience Publishers, 1964 and DE-AS 1 495 626, DE-OS 2 232 877, DE-OS 2 703 376, DE-OS 2 714 544, DE-OS 3 000 610, DE-OS 3 832 396; in relation to the production of polyester carbonates for example DE-OS 3 077 934).

Aromatic polycarbonates are produced for example by reacting diphenols with carbonic acid halides, preferably phosgene, and/or with aromatic dicarboxylic acid dihalides, preferably benzenedicarboxylic acid dihalides, by the phase interface process, optionally using chain terminators, for example monophenols, and optionally using trifunctional or greater than trifunctional branching agents, for example triphenols or tetraphenols.

Diphenols for the production of the aromatic polycarbonates and/or aromatic polyester carbonates are preferably those of the formula (II)

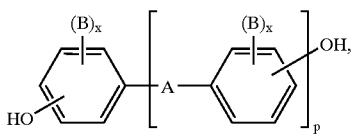

(II)

wherein
A means a single bond, $C_1$–$C_3$ alkylene, $C_2$–$C_5$ alkylidene, $C_5$–$C_6$ cycloalkylidene, —O—, —SO—, —CO—, —S—, —SO$_2$—, $C_6$–$C_{12}$ arylene, onto which further aromatic rings optionally containing heteroatoms may be fused,
or a residue of the formula (III) or (IV)

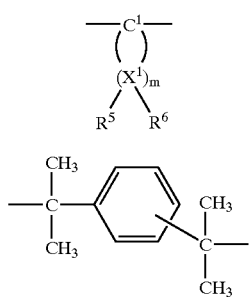

(III)

(IV)

B in each case means $C_1$–$C_{12}$ alkyl, preferably methyl, halogen, preferably chlorine and/or bromine
x in each case mutually independently mean 0, 1 or 2,
p means 1 or 0 and
$R^5$ and $R^6$ individually selectably, mutually independently for each $X^1$, mean hydrogen or $C_1$–$C_6$ alkyl, preferably hydrogen, methyl or ethyl,
$X^1$ means carbon and
m means an integer from 4 to 7, preferably 4 or 5, providing that $R^5$ and $R^6$ are simultaneously alkyl on at least one atom $X^1$.

Preferred diphenols are hydroquinones, resorcinol, dihydroxydiphenols, bis-(hydroxy-phenyl)-$C_1$–$C_5$-alkanes, bis(hydroxyphenyl)-$C_5$–$C_6$-cycloalkanes, bis-(hydroxyphenyl) ethers, bis-(hydroxyphenyl) sulfoxides, bis-(hydroxyphenyl) ketones, bis-(hydroxyphenyl) sulfones and α,α-bis-(hydroxyphenyl)diisopropylbenzenes together with the ring-brominated and/or ring-chlorinated derivatives thereof.

Particularly preferred diphenols are 4,4'-dihydroxydiphenyl, bisphenol A, 2,4-bis-(4-hydroxyphenyl) 2-methylbutane, 1,1-bis-(4-hydroxyphenyl)cyclohexane, 1,1-bis-(4-hydroxyphenyl)-3,3,5-trimethylcyclohexane, 4,4'-dihydroxydiphenyl sulfide, 4,4'-dihydroxydiphenyl sulfone together with the di- and tetrabrominated or chlorinated derivatives thereof, such as for example 2,2-bis-(3-chloro-4-hydroxyphenyl)propane, 2,2-bis-(3,5-dichloro-4-hydroxyphenyl)propane or 2,2-bis3,5-dibromo-4-hydroxyphenyl)propane.

2,2-Bis-(4-hydroxyphenyl)propane (bisphenol A) is particularly preferred.

The diphenols may be used individually or as any desired mixtures.

The diphenols are known from the literature or are obtainable using processes known from the literature.

Chain terminators suitable for the production of the thermoplastic, aromatic polycarbonates are, for example, phenol, p-chlorophenol, p-tert.-butylphenol or 2,4,6-tribromophenol, as well as long-chain alkylphenols, such as 4-(1,3-tetramethylbutyl)-phenol according to DE-OS 2 842 005 or monoalkylphenol or dialkylphenols having a total of 8 to 20 C atoms in the alkyl substituents, such as 3,5-di-tert.-butylphenol, p-iso-octylphenol, p-tert.-octylphenol, p-dodecylphenol and 2-(3,5dimethylheptyl)-phenol and 4-(3,5-dimethylheptyl)phenol. The quantity of chain terminators to be used is generally between 0.5 mol. % and 10 mol. %, relative to sum of moles of the diphenols used in each case.

The thermoplastic, aromatic polycarbonates have weight average molecular weights ($M_w$, measured for example by ultracentrifugation or light scattering) of 10000 to 200000, preferably of 20000 to 80000.

The thermoplastic, aromatic polycarbonates may be branched in a known manner, preferably by incorporating 0.05 to 2.0 mol. %, relative to the sum of diphenols used, of trifunctional or greater than trifunctional compounds, for example those having three and more than three phenolic groups.

Both homopolycarbonates and copolycarbonates are suitable. Component A copolycarbonates according to the invention may be produced by also using 1 to 25 wt. %, preferably 2.5 to 25 wt. % (relative to the total quantity of diphenols to be used) of polydiorganosiloxanes having hydroxy-aryloxy end groups. These are known (c.f. for example U.S. Pat. No. 3,419,634) or may be produced using processes known from the literature. The production of copolycarbonates containing polydiorganosiloxanes is described, for example, in DE-OS 3 334 782.

Preferred polycarbonates, apart from bisphenol A homopolycarbonates, are copolycarbonates of bisphenol A with up to 15 mol. %, relative to the sum of moles of diphenols, of other diphenols mentioned as preferred or particularly preferred, in particular 2,2-bis3,5-dibromo4-hydroxyphenyl)propane.

Aromatic dicarboxylic acid dihalides for the production of aromatic polyester carbonates are preferably the diacid dichlorides of isophthalic acid, terephthalic acid, diphenyl ether 4,4'-dicarboxylic acid and 2,6-naphthalenedicarboxylic acid.

Mixtures of the diacid dichlorides of isophthalic acid and terephthalic acid in a ratio of between 1:20 and 20:1 are particularly preferred.

A carbonic acid halide, preferably phosgene, is additionally used as a difunctional acid derivative in the production of polyester carbonates.

Chain terminators which may be considered for the production of the aromatic polyester carbonates are, apart from the above-mentioned monophenols, also the chlorocarbonic acid esters thereof and the acid chlorides of aromatic monocarboxylic acids, which may optionally be substituted by $C_1$–$C_{22}$ alkyl groups or by halogen atoms, together with aliphatic $C_2$–$C_{22}$ monocarboxylic acid chlorides.

The quantity of chain terminators is in each case 0.1 to 10 mol. %, relative, in the case of phenolic chain terminators, to the number of moles of diphenols and, in the case of monocarboxylic acid chloride chain terminators, to the number of moles of dicarboxylic acid dichlorides.

The aromatic polyester carbonates may also contain incorporated aromatic hydroxycarboxylic acids.

The aromatic polyester carbonates may be both linear and branched in a known manner (c.f. in this connection also DE-OS 2 940 024 and DE-OS 3 007 934).

Branching agents which may be used are, for example, tri- or polyfunctional carboxylic acid chlorides, such as trimesic acid trichloride, cyanuric acid trichloride, 3,3',4,4'-benzophenonetetracarboxylic acid tetrachloride, 1,4,5,8-naphthalene-tetracarboxylic acid tetrachloride or pyromellitic acid tetrachloride, in quantities of 0.01 to 1.0 mol. % (relative to dicarboxylic acid dichlorides used) or tri- or polyfunctional phenols, such as phloroglucinol, 4,6-dimethyl-2,4,6-tri-(4-hydroxy-phenyl)-2-heptene, 4,4-dimethyl-2,4,6-tri(4-hydroxyphenyl)heptane, 1,3,5-tri-(4-hydroxyphenyl)benzene, 1,1,1-tri4-hydroxyphenylethane, tri(4-hydroxy-phenyl)phenylmethane, 2,2-bis-[4,4-bis-(4-hydroxyphenyl)cyclohexyl]propane, 2,4-bis4-hydroxyphenylisopropyl)phenol, tetra-(4-hydroxyphenyl)methane, 2,6bis-(2-hydroxy-5-methylbenzyl)-4-methylphenol, 2-(4-hydroxyphenyl)-2-(2,4-dihydroxyphenyl)propane, tetra-(4-[4-hydroxyphenylisopropyl]phenoxy)methane, 1,4-bis[4,4'-dihydroxytriphenyl)methyl]benzene, in quantities of 0.01 to 1.0 mol. %, relative to diphenols used. Phenolic branching agents may be introduced initially with the diphenols, acid chloride branching agents may be introduced together with the acid dichlorides.

The proportion of carbonate structural units in the thermoplastic, aromatic polyester carbonates may be varied at will. The proportion of carbonate groups is preferably up to 100 mol. %, in particular up to 80 mol. %, particularly preferably up to 50 mol. %, relative to the sum of ester groups and carbonate groups. Both the ester and carbonate fractions of the aromatic polyester carbonates may be present in the form of blocks or randomly distributed in the polycondensation product.

The relative solution viscosity ($\eta_{rel}$) of the aromatic polycarbonates and polyester carbonates is in the range from 1.18 to 1.4, preferably from 1.22 to 1.3 (measured on solutions of 0.5 g of polycarbonate or polyester carbonate in 100 ml of methylene chloride solution at 25° C.).

The thermoplastic, aromatic polycarbonates and polyester carbonates may be used alone or as any desired mixture with each other.

Component B

Component B comprises one or more graft polymers of
B.1 5 to 95, preferably 30 to 80 wt. %, of at least one vinyl monomer on
B.2 95 to 5, preferably 70 to 20 wt. %, of one or more particulate diene rubbers having glass transition temperatures of <10° C., preferably of <0° C., particularly preferably of <−20° C.,
which are produced by emulsion polymerisation by means of an initiator system comprising organic hydroperoxide and ascorbic acid.

The grafting backbone B.2 generally has an average particle size ($d_{50}$ value) of 0.05 to 5 μm, preferably of 0.10 to 0.6 μm, particularly preferably of 0.20 to 0.40 μm.

Monomers B.1 are preferably mixtures of
B.1.1 50 to 99 parts by weight of vinyl aromatics and/or ring-substituted vinyl aromatics (such as for example styrene, α-methylstyrene, p-methylstyrene, p-chlorostyrene) and/or methacrylic acid ($C_1$–$C_8$)alkyl esters (such as for example methyl methacrylate, ethyl methacrylate) and
B.1.2 1 to 50 parts by weight of vinyl cyanides (unsaturated nitriles such as acrylonitrile and methacrylonitrile) and/or (meth)acrylic acid ($C_1$–$C_8$)-alkyl esters (such as for example methyl methacrylate, n-butyl acrylate, t-butyl acrylate) and/or derivatives (such as anhydrides and imides) of unsaturated carboxylic acids (for example maleic anhydride and N-phenylmaleimide).

Preferred monomers B.1.1 are selected from among at least one of the monomers styrene, α-methylstyrene and methyl methacrylate, preferred monomers B.1.2 are selected from among at least one of the monomers acrylonitrile, maleic anhydride and methyl methacrylate.

Particularly preferred monomers are B.1.1 styrene and B.1.2 acrylonitrile,

Preferred grafting backbones B.2 are diene rubbers (for example based on butadiene, isoprene etc.) or mixtures of diene rubbers or copolymers of diene rubbers or mixtures thereof with further copolymerisable monomers (for example according to B. 1.1 and B.1.2), providing that the glass transition temperature of component B.2 is <10° C., preferably <0° C., particularly preferably <−10° C.

Pure polybutadiene rubber is particularly preferred.

Particularly preferred graft polymers are those prepared from
a) 40 to 90 wt. % of particulate diene rubber of an average particle diameter of 0.1 to 0.6 μm and
b) 60 to 10 wt. % of styrene, acrylonitrile, methyl methacrylate or mixtures thereof by emulsion graft polymerisation.

which are characterised in that graft polymerisation is performed using an initiator system comprising an organic hydroperoxide and ascorbic acid to achieve a grafting yield of >60 wt. %, preferably of >75 wt. %, in particular of >85 wt. % (relative to monomers B.1 or b used).

According to a preferred embodiment, the monomers a) are graft polymerised in an aqueous emulsion in the presence of an emulsion of the rubber polymer b) at temperatures of 40 to 70° C., in particular of 50 to 70° C., using an initiator system comprising an organic hydroperoxide (I) and ascorbic acid (II), wherein in general 0.3 to 1.5 parts by weight of (I) and 0.1 to 1 part by weight of (II) are used, in each case relative to 100 parts by weight of graft monomer and the weight ratio of (I):(II) is 0.3 to 15, in particular 1to 10, preferably 3 to 8 (c.f. DE-A 37 08 913 (=U.S. Pat. No. 4,859,744) and EP-A-315 868 (=U.S. Pat. No. 4,937,285)).

The rubbers are generally partially crosslinked and have gel contents of 10 to 90 wt. %, in particular of 40 to 80 wt. %, and are particulate with average particle sizes ($d_{50}$ values) of 0.1 to 0.6 μm, in particular of 0.2 to 0.4 μm. Such particulate rubbers are known. They are produced by emulsion polymerisation and generally assume the form of latices.

The graft polymers are produced in an aqueous emulsion by polymerising the monomers onto a rubber present in the form of an aqueous emulsion. Surface-active auxiliaries, emulsifiers or dispersants are conventionally used in this process, optionally together with additives to establish specific pH values and electrolyte contents during graft polymerisation. Under certain circumstances, the emulsion graft polymerisation may also be performed without adding emulsifiers, in particular if the process is performed using small quantities of monomers relative to the quantity of rubber, or if the quantities of emulsifier already present in the rubber emulsion (latex) itself are sufficient to maintain graft polymerisation of the monomers in the emulsion state with adequate emulsion stability.

Anionic emulsifiers are particularly suitable, preferably alkali metal salts of fatty acids, resin acids, disproportionated resin acids, alkylsulfonic acids, arylsulfonic acids. They are used in quantities of up to 5 wt. %, preferably of up to 2.5 wt. %, relative to the monomers to be polymerised.

Suitable hydroperoxides are, for example, cumene hydroperoxide, tert.-butyl hydroperoxide, hydrogen peroxides, preferably cumene hydroperoxide and tert.-butyl hydroperoxides, i.e. hydroperoxides having long half-lives.

An aqueous emulsion of a partially crosslinked diene rubber is grafted discontinuously or continuously in an aqueous emulsion; the rubber emulsion is combined with the graft monomers, optionally together with additional emulsifier, and hydroperoxide together with ascorbic acid solutions at polymerisation temperatures of 40 to 70° C., in particular of 50 to 70° C. The quantity ratios described above should be maintained during this process. In exceptional cases, small quantities of heavy metal cations, in particular Fe, may be added to the polymerisation as an additional component of the initiator system, in particular if it is necessary to use diene rubber emulsions which themselves already contain relatively large quantities of complexing agents. The process is normally performed without the addition of iron ions; this method is preferred and advantageously allows the production of graft polymers containing virtually no heavy metals or having low heavy metal contents, as such traces of metal are known to have a disadvantageous effect on the applicational properties of plastics. The process is performed using aqueous solutions of ascorbic acid and aqueous solutions of hydroperoxide; it is advantageous to introduce insufficiently water-soluble hydroperoxides, such as cumene hydroperoxide, into the polymerisation system in the form of an aqueous emulsion. The emulsifier used in such emulsions is advantageously the same as is used in the graft polymerisation.

The hydroperoxide and the ascorbic acid may be apportioned to the graft polymerisation in portions or continuously. In a preferred variant, a proportion of the hydroperoxide is initially introduced into the reactors with the rubber to be grafted; the graft monomers together with the remaining ascorbic acid, hydroperoxide and optionally emulsifier are separately introduced into the reactor as polymerisation proceeds.

The quantities of hydroperoxide and ascorbic acid are critical. Addition of excessive quantities of hydroperoxide and/or ascorbic acid impairs the graft polymerisation. The grafting yield falls; the molecular weight of the grafted and free resin decreases; monomer conversion and emulsion stability may also react sensitively to deficits or excesses in the quantities of hydroperoxide and ascorbic acid, making it technically impossible to perform the graft polymerisation. It is essential that a temperature of 40 to 70° C. and the above-stated hydroperoxide/ascorbic acid quantities be maintained during the graft polymerisation in order to optimise performance of the process, the structure of the graft polymers and the physical properties thereof.

When graft polymerisation is continued up to monomer conversions of greater than 90 wt. %, in particular of greater than 98 wt. %, storage-stable graft polymer emulsions having polymer contents of 25 to 50 wt. % are obtained; the graft polymer may readily be isolated from the emulsions by known coagulation processes (for example by means of acids or salts). If it is desired to combine the graft polymers with thermoplastic resins which themselves are in the form of an emulsion, the graft polymer emulsion may be mixed with the resin emulsion and the mixture coagulated.

The gel content of the grafting backbone B.2 is determined in a suitable solvent (M. Hoffman, H. Krömer, R. Kuhn, *Polymeranalytik I & II*, Georg Thieme-Verlag, Stuttgart 1977).

The average particle size $d_{50}$ is the diameter both above and below which 50 wt. % of the particles lie. This value may be measured by ultracentrifugation (W. Scholtan, H. Lange, *Kolloid Z. und Z. Polymere*, 250 (1972), 782–1796).

Component C

Component C comprises one or more thermoplastic vinyl (co)polymers C.1, and/or polyalkylene terephthalates C.2.

Suitable (co)polymers C.1 are polymers of at least one monomer from the group of vinyl aromatics, vinyl cyanides (unsaturated nitrites), (meth)acrylic acid ($C_1$–$C_8$)-alkyl esters, unsaturated carboxylic acids and derivatives (such as anhydrides and imides) of unsaturated carboxylic acids. Particularly suitable (co)polymers are those prepared from C.1.1 50 to 99, preferably 60 to 80 parts by weight of vinyl aromatics and/or ring-substituted vinyl aromatics such as for example styrene, α-methylstyrene, p-methylstyrene, p-chlorostyrene) and/or methacrylic acid ($C_1$–$C_4$)-alkyl esters such as for example methyl methacrylate, ethyl methacrylate) and C.1.2 1 to 50, preferably 20 to 40 parts by weight of vinyl cyanides (unsaturated nitriles) such as acrylonitrile and methacrylonitrile and/or (meth)acrylic acid ($C_1$–$C_8$)-alkyl esters (such as for example methyl methacrylate, n-butyl acrylate, t-butyl acrylate) and/or unsaturated carboxylic acids (such as maleic acid) and/or derivatives (such as anhydrides and imides) of unsaturated carboxylic acids (for example maleic anhydride and N-phenylmaleimide).

The (co)polymers C.1 are resinous, thermoplastic and rubber-free.

The copolymer of C.1.1 styrene and C.1.2 acrylonitrile is particularly preferred.

The (co)polymers C.1 are known and maybe produced by free-radical polymerisation, in particular by emulsion, suspension, solution or bulk polymerisation. The (co) polymers C.1 preferably have molecular weights $M_w$ (weight average, determined by light scattering or sedimentation) of between 15000 and 200000.

The component C.2 polyalkylene terephthalates are reaction products of aromatic dicarboxylic acids or the reactive derivatives thereof, such as dimethyl esters or anhydrides, and aliphatic, cycloaliphatic or araliphatic diols, together with mixtures of these reaction products.

Preferred polyalkylene terephthalates contain at least 80 wt. %, preferably at least 90 wt. %, relative to the dicarboxylic acid component, of terephthalic acid residues and at least 80 wt. %, preferably at least 90 mol. %, relative to the diol component, of ethylene glycol and/or 1,4-butanediol residues.

In addition to terephthalic acid residues, the preferred polyalkylene terephthalates may contain up to 20 mol. %, preferably up to 10 mol. %, of residues of other aromatic or cycloaliphatic dicarboxylic acids having 8 to 14 C atoms or aliphatic dicarboxylic acids having 4 to 12 C atoms, such as for example residues of phthalic acid, isophthalic acid, 2,6naphthalenedicarboxylic acid, 4,4'-phenyldicarboxylic acid, succinic acid, adipic acid, sebacic acid, azelaic acid, cyclohexanediacetic acid.

In addition to ethylene glycol or 1,4-butanediol residues, the preferred polyalkylene terephthalates may contain up to 20 mol. %, preferably up to 10 mol. %, of other aliphatic diols having 3 to 12 C atoms or cycloaliphatic diols having 6 to 21 C atoms, for example residues of 1,3-propanediol, 2-ethyl-1,3-propanediol, neopentyl glycol, 1,5-pentanediol, 1,6-hexanediol, 1,4cyclohexanedimethanol, 3-ethyl-2,4-pentanediol, 2-methyl-2,4-pentanediol, 2,2,4-trimethyl-1,3-pentanediol, 2-ethyl-1,3-hexanediol, 2,2diethyl-1,3-propanediol, 2,5-hexanediol, 1,4-di-(β-hydroxyethoxy)benzene, 2,2-bis4-hydroxycyclohexyl)propane, 2,4-dihydroxy-1,1,3,3-tetramethylcyclobutane, 2,2-bis-(4-β- hydroxyethoxyphenyl)propane and 2,2-bis-(4hydroxypropoxyphenyl)-propane (DE-OS 2 407 674, 2 407 776, 2 715 932).

The polyalkylene terephthalates may be branched by incorporating relatively small quantities of tri- or tetrahydric alcohols or tri- or tetrabasic carboxylic acids, for example according to DE-OS 1 900 270 and U.S. Pat. No. 3,692,744. Examples of further preferred branching agents are trimesic acid, trimellitic acid, trimethylolethane and trimethylolpropane and pentaerythritol.

Particularly preferred polyalkylene terephthalates are those solely produced from terephthalic acid and the reactive derivatives thereof (for example the dialkyl esters thereof) and ethylene glycol and/or 1,4-butanediol, and mixtures of these polyalkylene terephthalates.

Mixtures of polyalkylene terephthalates contain 1 to 50 wt. %, preferably 1 to 30 wt. %, of polyethylene terephthalate and 50 to 99 wt. %, preferably 70 to 99 wt. %, of polybutylene terephthalate.

The preferably used polyalkylene terephthalates generally have an intrinsic viscosity of 0.4 to 1.5 dl/g, preferably of 0.5 to 1.2 dl/g, measured in phenol/o-dichlorobenzene (1:1 parts by weight) at 25° C. in a Ubbelohde viscosimeter.

The polyalkylene terephthalates may be produced using known methods (c.f. for example Kunsistoff-Handbuch, volume III, pp. 695 et seq., Carl Hanser Verlag, Munich 1973).

Component D

Component D phosphazenes which are used according to the present invention are line phosphazenes of the formula (Ia) and cyclic phosphazenes of the formula (Ib)

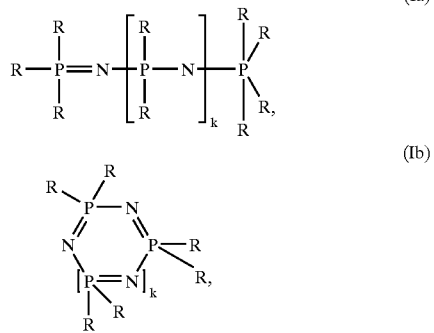

wherein
R and k have the above-stated meaning.
The following may be mentioned by way of example:
propoxyphosphazene, phenoxyphosphazene, methylphenoxyphosphazene, aminophosphazene and fluoroalkylphosphazenes.
Phenoxyphosphazene is preferred.
The phosphazenes may be used alone or as a mixture. The residue R may always be identical or two or more residues in the formula (Ia) and (Ib) may be different.
The phosphazenes and the production thereof are described, for example, in EP-A 728 811, DE-A 1 961 668 and WO 97/40 092.

Component E

The fluorinated polyolefins E are of a high molecular weight and have glass transition temperatures of above −30° C., generally of above 100° C., fluorine contents preferably of 65 to 76, in particular of 70 to 76 wt. %, average particle diameters $d_{50}$ of 0.05 to 1000, preferably of 0.08 to 20 µm. The fluorinated polyolefins E generally have a density of 1.2 to 2.3 g/cm$^3$. Preferred fluorinated polyolefins E are polytetrafluoroethylene, polyvinylidene fluoride, tetrafluoroethylene/hexafluoropropylene and ethylene/tetrafluoroethylene copolymers. The fluorinated polyolefins are known (c.f. *Vinyl & Related Polymers* by Schildknecht, John Wiley & Sons Inc., New York, 1962, pp. 484–494; *Fluoropolymers* by Wall, Wiley-Interscience, John Wiley & Sons Inc., New York, volume 13, 1970, pp. 623–654; *Modern Plastics Encyclopedia*, 1970–1971, volume 47, no. 10 A, October 1970, McGraw-Hill Inc., New York, pp. 134 and 774; *Modern Plastics Encyclopedia*, 1975–1976, October 1975, volume 52, no. 10A, McGraw-Hill Inc., New York, pp. 27, 28 and 472 and U.S. Pat. Nos. 3,671,487, 3,723,373 and 3,838,092).

They may be produced using known processes, thus for example by polymerising tetrafluoroethylene in an aqueous medium with a free-radical forming catalyst, for example sodium, potassium or ammonium peroxydisulfate, at pressures of 7 to 71 kg/cm$^2$ and at temperatures of 0 to 200° C., preferably at temperatures of 20 to 100° C. (c.f. for example U.S. Pat. No. 2,393,967 for further details). Depending upon the form in which they are used, the density of these materials may be between 1.2 and 2.3 g/cm$^3$, the average particle size between 0.5 and 1000 µm.

Polyolefins E preferred according to the invention are tetrafluoroethylene polymers having average particle diameters of 0.05 to 20 µm, preferably of 0.08 to 10 µm, and a density of 1.2 to 1.9 g/cm$^3$ and are preferably used in the form of a coagulated mixture of emulsions of tetrafluoroethylene polymers E with emulsions of the graft polymers B.

Suitable polyolefins B usable in powder form are tetrafluoroethylene polymers having average particle diameters of 100 to 1000 µm and densities of 2.0 g/cm$^3$ to 2.3 g/cm$^3$.

A coagulated mixture of B and E is produced by firstly mixing an aqueous emulsion (latex) of a graft polymer B with a finely divided emulsion of a tetrafluoroethylene polymer E; suitable tetrafluoroethylene polymer emulsions conventionally have solids contents of 30 to 70 wt. %, in particular of 50 to 60 wt. %, preferably of 30 to 35 wt. %.

The quantity stated in the description of component B may include the proportion of the graft polymer for the coagulated mixture prepared from the graft polymer and fluorinated polyolefin.

The weight ratio of graft polymer B to tetrafluoroethylene polymer E in the emulsion mixture is 95:5 to 60:40. The emulsion mixture is then coagulated in a known manner, for example by spray drying, freeze drying or coagulation by addition of inorganic or organic salts, acids, bases or organic, water-miscible solvents, such as alcohols, ketones, preferably at temperatures of 20 to 150° C., in particular of 50 to 100° C. If necessary, drying may be performed at 50 to 200° C., preferably at 70 to 100° C.

Suitable tetrafluoroethylene polymer emulsions are conventional commercial products and are offered for sale, for example, by DuPont as Teflon® 30 N.

The moulding compositions according to the invention may contain at least one of the conventional additives, such as lubricants and mould release agents, nucleating agents, anti-static agents, stabilisers as well as dyes and pigments.

The moulding compositions according to the invention may contain up to 35 wt. %, relative to the overall moulding composition, of a further, optionally synergistic flame retardant. Examples of further flame retardants which may be mentioned are organic halogen compounds, such as decabromobisphenyl ether, tetrabromobisphenol, inorganic halogen compounds such as ammonium bromide, nitrogen compounds, such as melamine, melamineIformaldehyde resins, inorganic hydroxide compounds, such as Mg, Al hydroxide, inorganic compounds such as antimony oxides, barium metaborate, hydroxoantimonate, zirconium oxide, zirconium hydroxide, molybdenum oxide, ammonium molybdate, zinc borate, ammonium borate, barium metaborate, talc, silicone, silicon dioxide and tin oxide, as well as siloxane compounds.

The moulding compositions according to the invention containing components A to E and optionally further known additives such as stabilisers, dyes, pigments, lubricants and mould release agents, nucleating agents, as well as antistatic agents, are produced by mixing the particular constituents in a known manner and melt-compounding and melt-extruding them at temperatures of 200° C. to 300° C. in conventional units such as internal kneaders, extruders and twin-screw extruders, wherein component E is preferably used in the form of the above-mentioned coagulated mixture.

The individual constituents may be mixed in a known manner both in succession and simultaneously and both at approx. 20° C. (room temperature) and at a higher temperature.

By virtue of their excellent flame resistance and very good mechanical properties, the thermoplastic moulding compositions according to the invention are suitable for the production of mouldings of all kinds, in particular those requiring elevated resistance to breakage.

The moulding compositions of the present invention may be used for the production of mouldings of any kind. Mouldings may in particular be produced by injection moulding. Examples of mouldings which may be produced are: casings of all kinds, for example for domestic appliances such as juice extractors, coffee machines, food mixers, for office equipment, such as monitors, printers, copiers or cladding sheets for the building sector and automotive components. They may also be used in electrical engineering applications as they have very good electrical properties.

The moulding compositions according to the invention may furthermore, for example, be used to produce the following mouldings or shaped articles:
1. Interior trim for rail vehicles (FR)
2. Hub-caps
3. Casings for electrical devices containing small transformers
4. Casings for information dissemination and transmission devices
5. Casings and cladding for medical purposes
6. Massage devices and casings therefor
7. Toy vehicles for children
8. Sheet wall elements
9. Casings for safety equipment
10. Hatchback spoilers
11. Thermally insulated transport containers
12. Apparatus for keeping or caring for small animals
13. Mouldings for sanitary and bathroom installations
14. Cover grilles for ventilation openings
15. Mouldings for summer houses and sheds
16. Casings for garden appliances.

Another processing method is the production of mouldings by thermoforming of previously produced sheets or films.

The present invention accordingly also provides the use of the moulding compositions according to the invention for the production of mouldings of all kinds, preferably those stated above, and the mouldings made from the moulding compositions according to the invention.

EXAMPLES

Component A

Linear bisphenol A based polycarbonate having a relative solution viscosity of 1.252, measured in $CH_2Cl_2$ as solvent at 25° C. and a concentration of 0.5 g/100 ml.

Component B

Grafting Backbone:

B.2 Emulsion of a partially crosslinked, coarsely particulate polybutadiene having an average particle diameter of 0.40 µm ($d_{50}$ value), a gel content of 89 wt. %. The emulsion contains 50 wt. % polymer solids.

Production of the Graft Polymers:

Ba) Graft polymer prepared from 55 wt. % of diene rubber (B.2) and 45 wt. % of SAN copolymer according to DE-A-37 08 913.

A mixture of 200 parts by weight of the latex (B.2) and 149 parts by weight of water is initially introduced into a reactor and heated to 60 to 62° C. At this temperature, the following two solutions or emulsions are added to the reactor in the following order:

1. 0.0836 parts by weight of cumene hydroperoxide 6.9600 parts by weight of water 0.0600 parts by weight of Na salt of $C_{14}$–$C_{16}$-alkylsulfonic acids
2. 0.0557 parts by weight of ascorbic acid 6.9600 parts by weight of water.

The following feeds are then stirred into the reactor within 4 hours at an internal temperature of 60 to 62° C.:

Z1) 39.05 parts by weight of water 4.00 parts by weight of Na salt of disproportionated abietic acid 3.10 parts by weight of 1n sodium hydroxide solution 0.62 parts by weight of cumene hydroperoxide Z2) 59 parts by weight of styrene 23 parts by weight of acrylonitrile Z3) 39.800 parts by weight of water 0.105 parts by weight of ascorbic acid Polymerisation is then taken to completion at 60 to 62° C. over a period of 6 hours. Monomer conversion is greater than 97 wt. %.

After stabilisation with 1.2 parts by weight of phenolic anti-oxidant per 100 parts by weight of graft polymer, the graft polymer is isolated by coagulation with an acetic acid/Mg sulfate mixture, washed and dried to yield a powder.

SAN grafting proceeded at a grafting yield of 89 wt. %.

The grafting yield was determined by fractional emulsion cracking in an ultracentrifuge using dimethylformamide/methylcyclohexane as the cracking liquids and determining the quantities and chemical composition of the resultant fractions (c.f. R. Kuhn, *Makromol. Chemie* 177, 1525 (1976)).

Bb) Graft polymer prepared from 55 wt. % of diene rubber (B.2) and 45 wt. % of SAN copolymer

Comparative Example

The following components are initially introduced into a reactor:

1500 parts by weight of emulsion B.2 and 1030 parts by weight of water. After heating to 65° C., an initiator solution comprising 3 parts by weight of potassium peroxydisulfate in 50 parts by weight of water was introduced. The following two solutions were then introduced into the reactor at 65° C. within 6 hours:

1. 442 parts by weight of styrene 172 parts by weight of acrylonitrile
2. 1000 parts by weight of water 13 parts by weight of Na salt of disproportionated abietic acid 10 parts by weight of 1n sodium hydroxide solution Polymerisation is then taken to completion within 4 hours by continuing stirring at 65° C. Monomer conversion is greater than 98 wt. %. The graft polymer is stabilised and isolated following the procedure for Ba). SAN grafting proceeded at a grafting yield of 55 wt. %. Grafting yield was determined in the same manner as for Ba).

Component C

Styrene/acrylonitrile copolymer having a styrene/acrylonitrile weight ratio of 72:28 and an intrinsic viscosity of 0.55 dl/g (measured in dimethylformamide at 20° C.).

Component D

Phenoxyphosphazene of the formula

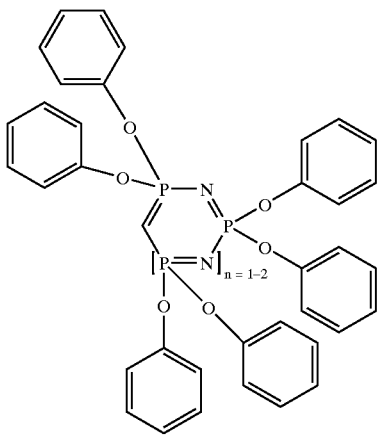

commercial product P-3800 from Nippon Soda Co. Ltd., Japan.

Component E

Tetrafluoroethylene polymer as a coagulated mixture prepared from an SAN graft polymer emulsion corresponding to the above-stated component B in water and a tetrafluoroethylene emulsion in water. The weight ratio of graft polymer B to the tetrafluoroethylene polymer E in the mixture is 90 wt. %:10 wt. %. The tetrafluoroethylene polymer emulsion has a solids content of 60 wt. %, the average particle diameter is between 0.05 and 0.5 $\mu$m. The SAN graft polymer emulsion has a solids content of 34 wt. % and an average latex particle diameter of $d_{50}$=0.28 $\mu$m.

Production of E

The emulsion of the tetrafluoroethylene polymer (Teflon 30 N from DuPont) is mixed with the emulsion of the SAN graft polymer B and stabilised with 1.8 wt. %, relative to polymer solids, of phenolic anti-oxidants. At 85 to 95° C., the mixture is coagulated at pH 4 to 5 with an aqueous solution of $MgSO_4$ (Epsom salts) and acetic acid, filtered and washed until virtually free of electrolytes, then the principal quantity of water is removed by centrifugation and the material then dried at 100° C. to yield a powder. This powder may be compounded with the other components in the units described.

Production and Testing of the Moulding Compositions According to the Invention

The components are mixed in a 3 litre internal kneader. The mouldings are produced at 260° C. on an Arburg model 270 E injection moulding machine.

The Vicat B softening point is determined to DIN 53 460 (ISO 306) on bars of dimensions 80×10×4 mm.

Weld line strength is determined by measuring the impact strength to DIN 53 453 at the weld line of test specimens injection moulded from both sides (processing temperature 260° C.) of dimensions 170×10×4 mm.

Stress cracking behaviour (ESC behaviour) was investigated on bars of dimensions 80×10×4 mm, processing temperature 260° C. The test medium used was a mixture of 60 vol. % toluene and 40 vol. % isopropanol. The test pieces were pre-stressed on a circular arc template (initial elongation in percent) and immersed in the test medium at room temperature. Stress cracking behaviour was evaluated on the basis of cracking or failure as a function of initial elongation in the test medium.

Composition and properties are summarised in Table 1 below.

TABLE

| Moulding compositions and properties thereof | | |
|---|---|---|
| | 1 | 2 (Comp.) |
| Components [parts by weight] | | |
| A | 66.7 | 66.7 |
| Ba | 8.0 | — |
| Bb | — | 8.0 |
| C | 9.4 | 9.4 |
| D | 12.0 | 12.0 |
| E | 4.2 | 42 |
| Properties | | |
| $a_k$ (ISO 180/1A) [kJ/m$^2$] | 59 | 48 |
| Vicat B 120 [° C.] | 107 | 107 |
| UL 94 V, 1.6 mm | V-0 | V-0 |
| $a_o$ (weld line) [kJ/m$^2$] | 16.5 | 12.2 |
| ESC behaviour, failure at $\epsilon_k$ [%] | 2.4 | 2.0 |

Distinct improvements in mechanical properties are achieved when the special graft polymer produced by means of a redox initiator system is used in polycarbonate moulding compositions in the presence of phenoxyphosphazene as the flame retardant. Elevated values for notched impact strength, weld line strength combined with good stress cracking resistance are pre-requisites for use in thin-walled casing components.

What is claimed is:

1. A thermoplastic moulding composition consisting of:
   A) 40 to 99 parts by weight of at least one of aromatic polycarbonate and polyester carbonate;
   B) 0.5 to 60 parts by weight of a graft polymer prepared from,
      B.1) 5 to 95 wt. % of one or more vinyl monomers, and
      B.2) 95 to 5 wt. % of one or more particulate diene rubbers having a glass transition temperature of <10° C., which are produced by emulsion polymerisation, said graft polymer being prepared by means of a graft polymerisation in the presence of an initiator system comprising an organic hydroperoxide and ascorbic acid, said graft polymerisation having a grafting yield of >60 wt. %;
   C) 0 to 45 parts by weight of at least one thermoplastic polymer selected from the group consisting of thermoplastic vinyl (co)polymers and polyalkylene terephthalates;

D) 0.1 to 50 parts by weight of at least one component selected from the group consisting of phosphazenes represented by the following formulae,

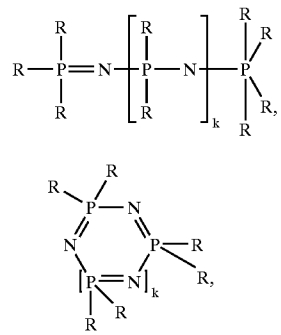

in which
R is in each case identical or different and denotes amino, $C_1$ to $C_8$ alkyl, in each case optionally halogenated, or $C_1$ to $C_8$ alkoxy, $C_5$ to $C_6$ cycloalkyl, $C_6$ to $C_{20}$ aryl, $C_6$ to $C_{20}$ aryloxy, or $C_7$ to $C_{12}$ aralkyl, in each case optionally substituted by alkyl and/or halogen,
k denotes 0 or a number from 1 to 15;
E) 0 to 5 parts by weight of fluorinated polyolefin; and
F) optionally at least one additive selected from the group consisting of lubricants, mould release agents, nucleating agents, anti-static agents, stabilisers, dyes and pigments.

2. The moulding composition of claim 1 comprising:
60 to 98.5 parts by weights of A;
1 to 40 parts by weight of B;
0 to 30 parts by weight of C;
2 to 35 parts by weight of D; and
0.1 to 1 parts by weight of E.

3. The moulding composition of claim 1 comprising 2 to 25 parts by weight of C.

4. The moulding composition of claim 1 comprising 5 to 25 parts by weight of D.

5. The moulding composition of claim 1 wherein vinyl monomers B.1 are mixtures prepared from:
B.1.1 50 to 99 parts by weight of at least one member selected from the group consisting of vinyl aromatics, ring-substituted vinyl aromatics and methacrylic acid $(C_1–C_8)$-alkyl esters; and
B.1.2 1 to 50 parts by weight of at least one member selected from the group consisting of vinyl cyanides, (meth)acrylic acid $(C_1–C_8$ alkyl esters, anhydrides of unsaturated carboxylic acids and imides of unsaturated carboxylic acids.

6. The moulding composition of claim 1 wherein the grafting yield, of said graft polymerisation, is >75 wt. %.

7. The moulding composition of claim 1 wherein the grafting yield, of said graft polymerisation, is >85 wt. %.

8. The moulding composition of claim 1 wherein component D is selected from the group consisting of propoxyphosphazene, phenoxyphosphazene, methylphenoxyphosphazene, aminophosphazene and fluoroalkylphosphazenes.

9. A method of producing the moulding composition of claim 1 comprising mixing and melt-compounding components A to E and optionally component F.

10. The molding composition of claim 1 wherein diene rubber B.2) is at least one member selected from the group consisting of diene rubber copolymers of diene rubber.

11. The molding composition of claim 1 wherein dien rubber B.2) is polybutadiene rubber.

12. The molding composition of claim 1 wherein the hydroperoxide, of the graft polymerisation of said graft polymer B, is at least one member selected from the group consisting of cumene hydroperoxide, tert.-butyl hydroperoxide and hydrogen peroxide.

13. A molded article comprising the composition of claim 1.

* * * * *

UNITED STATES PATENT AND TRADEMARK OFFICE
CERTIFICATE OF CORRECTION

PATENT NO. : 6,747,078 B1
DATED : June 8, 2004
INVENTOR(S) : Thomas Eckel et al.

It is certified that error appears in the above-identified patent and that said Letters Patent is hereby corrected as shown below:

Column 16,
Line 12, delete "($c_1$-$c_8$alkyl esters" and insert -- ($c_1$-$c_8$) -alkyl esters --.
Line 30, delete "dien" and insert -- diene --.

Signed and Sealed this

First Day of February, 2005

JON W. DUDAS
*Director of the United States Patent and Trademark Office*